United States Patent [19]

Minami et al.

[11] Patent Number: 4,785,443
[45] Date of Patent: Nov. 15, 1988

[54] LIGHT CONTROL CIRCUIT OF OPTICAL DISC SYSTEM

[75] Inventors: Akira Minami, Yokohama; Akio Futamata, Kawasaki, both of Japan

[73] Assignee: Fujitsu Limited, Kawasaki, Japan

[21] Appl. No.: 929,785

[22] Filed: Nov. 13, 1986

[30] Foreign Application Priority Data

Nov. 14, 1985 [JP] Japan ................. 60-255422

[51] Int. Cl.[4] ............................................. G11B 7/125
[52] U.S. Cl. .................................................... 369/116
[58] Field of Search ............... 369/100, 116, 109, 123, 369/124; 346/76 L; 250/205

[56] References Cited

U.S. PATENT DOCUMENTS

| | | | |
|---|---|---|---|
| 4,334,301 | 6/1982 | Kanamaru | 369/116 |
| 4,507,767 | 3/1985 | Takasugi | 369/116 |
| 4,509,156 | 4/1985 | Ohara et al. | 369/116 |

FOREIGN PATENT DOCUMENTS 61-192042 8/1986 Japan .

Primary Examiner—Donald McElheny, Jr.
Attorney, Agent, or Firm—Staas & Halsey

[57] ABSTRACT

A light control circuit of an optical disc system for controlling light from a light emitting element at a read power level even if a write data operation is performed. The light control circuit includes a light control circuit, a superimposedly energizing circuit for providing a light for data write and a subtraction circuit for subtracting a predetermined current from a light sensing element. A light control circuit may further include a reference value setting circuit for automatically finding and determining reference values of a read power level, a write power level, and a subtraction value. The reference values may be defined with respect to an origin of the characteristic of the light emitting element where a current flowing through the light emitting element is substantially zero. Alternatively, the reference values may be defined with respect to another origin of the characteristic of the light emitting element where a current flowing through the light emitting element is near to a current providing the first predetermined level.

25 Claims, 9 Drawing Sheets

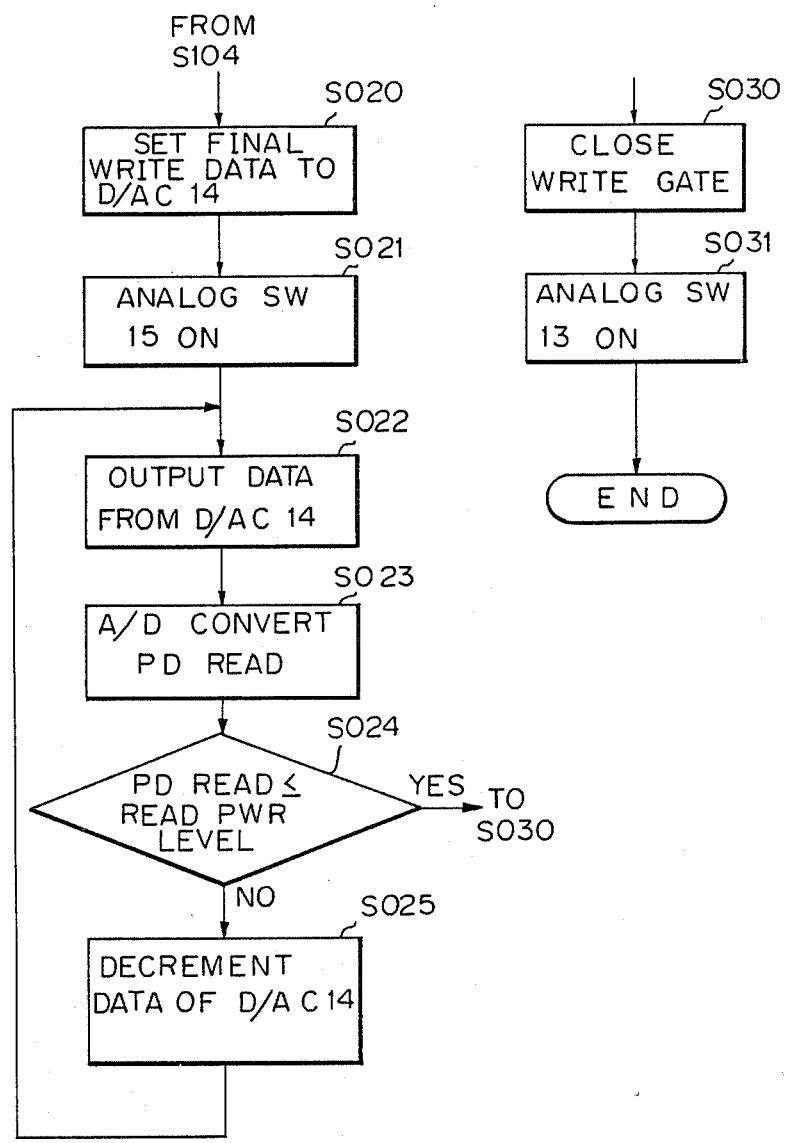

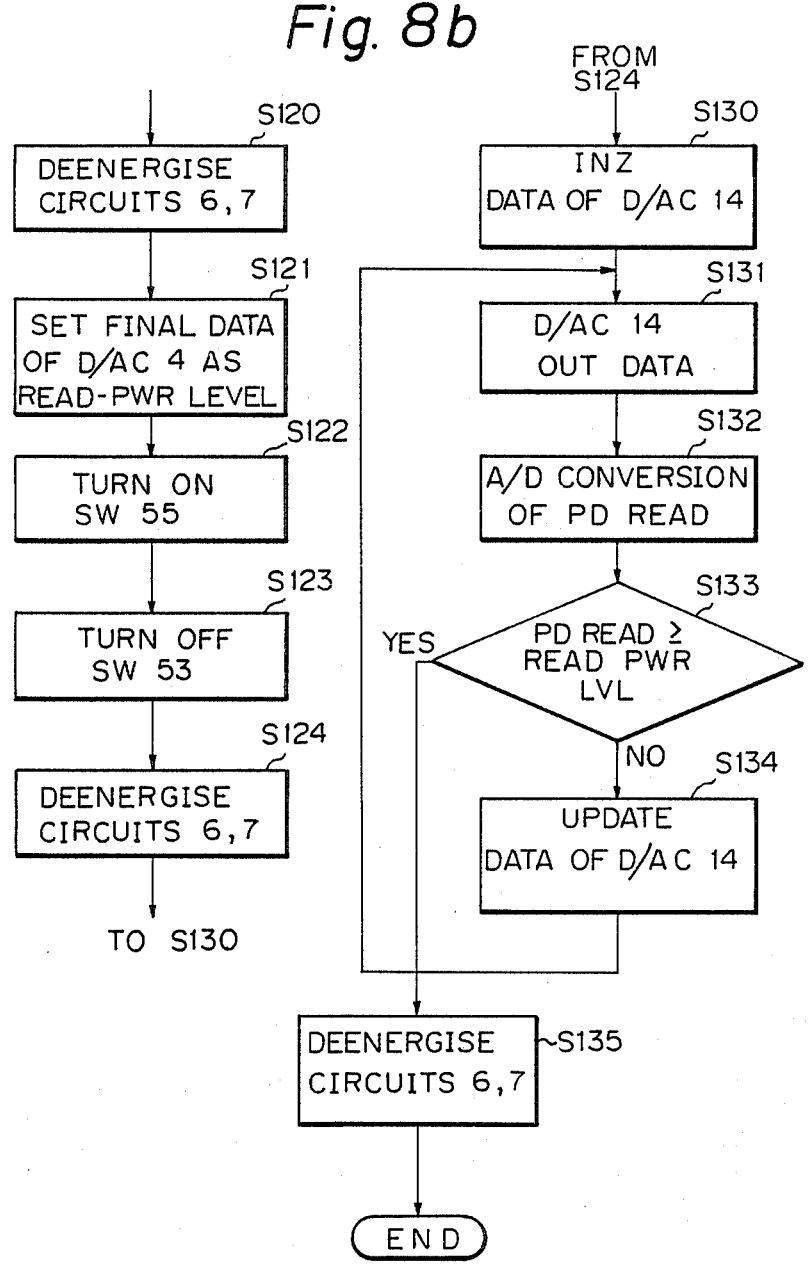

LIGHT CONTROL CIRCUIT OF OPTICAL DISC SYSTEM

BACKGROUND OF THE INVENTION

1. Field of the Invention

The present invention relates to an optical disc system for optically performing data writing/reading. More particularly, it relates to a light control circuit of an optical disc system which controls the level of beams emitted from a light emitting element at a predetermined rated level.

2. Description of the Related Art

An optical disc system used as a large-capacity external memory device for an information processing unit can record at a density more than ten times that of the recording density attainable by a conventional magnetic disc system.

Data recording in the optical disc system is accomplished, for example, by applying strong laser beams from a laser diode in a quantity corresponding to 5 to 10 mW as optical beams having a write power level to a recording film on an optical disc medium to form holes (pits) on the recording film by thermal reaction. This recording also can be accomplished by changing the crystal state of the recording film.

The data written in the optical recording medium can be read out from the quantity of reflected beams obtained when weak laser beams emitted from the laser diode in a quantity corresponding, for example, to about 1 mW, are applied as optical beams having a read power level to the recording film.

In order to stably obtain laser beams in quantities such as the write power level and read power. level, the emission quantity of the laser diode is monitored by a photodiode and a laser control circuit controls the emission power of the laser diode in response to the monitor current therethrough.

The laser diode has inherent characteristics, and when the laser diode is used for the optical disc system, these inherent characteristics are adjusted so that a substantially constant write power level and read power level can be obtained.

A simple control circuit is needed in which the above mentioned adjustment and control for always obtaining a constant write power level and read power level can be easily accomplished.

SUMMARY OF THE INVENTION

An object of the present invention is to provide a light control circuit of an optical disc system having a light emitting element used for writing data to and reading data from an optical disc, for performing a precise automatic power control at a read level of the light emitting element even if the write operation is effected by the light emitting element.

Another object of the present invention is to further provide a light control circuit of an optical disc system for achieving the above operation, for further performing an initial setting of parameters used for the above automatic power control with ease in response to the characteristics of the light emitting element.

Still another object of the present invention is to provide a light control circuit of an optical disc system for achieving the above initial parameter setting with an improved accuracy.

Yet another object of the present invention is to provide preferable methods for achieving the above initial parameter setting.

According to the present invention, there is provided a light control circuit of an optical disc system having an optical disc storing data, a light emitting element used for writing data to and reading data from the optical disc, and a light sensing element sensing light from the light emitting element. The light control circuit includes a circuit, operatively connected to the light emitting element and the light sensing element, for energizing the light emitting element and controlling a light level of the light emitting element at a first predetermined level sufficient for reading data from the optical disc in response to a signal from the light sensing element; a circuit, operatively connected to the light emitting element and the light control circuit, for superimposedly energizing the light emitting element in addition to the energization at the light control circuit at a second predetermined level sufficient for writing data in the optical disc, when data are to be written in the optical disc; and, a circuit, operatively connected to the light sensing element and to the light control circuit in parallel, synchronously operable with the superimposedly energizing circuit, for subtracting a third predetermined level corresponding to the electrical power superimposed energized onto the light emitting element from the signal of the light sensing element.

According to the present invention, there is also provided a light control circuit further including a reference value setting circuit, operatively connected to the light control circuit, the superimposedly energizing circuit, the subtracting circuits and the light sensing element, for continuously finding and determining the first to third predetermined levels in response to the characteristic of the light emitting element and setting the determined levels as the predetermined levels to the corresponding circuits at an adjustment time, which is not a normal operation time.

The predetermined levels are defined with respect to an origin of the characteristic of the light emitting element where a current flowing through the light emitting element is substantially zero.

According to the present invention, there is further provided a method for setting reference values of the light control circuit. The method includes the following steps of: substantially disabling the light control circuit; continuously changing data through a first D/A converter until a read level of the light sensing element reaches the first predetermined level and determining a first reference value for the first predetermined level; energizing the superimposedly energizing circuit; continuously changing other data through a second D/A converter until a read level of the light sensing element reaches the second predetermined level and determining a second reference value for the second predetermined level; energizing the subtracting circuit and setting the second reference value to a third D/A converter for an initial data; continuously decreasing the data for outputting from the third D/A converter until a read level of the light sensing element reaches the first predetermined level and determining a third reference value for the third reference level; and restoring the operation of the light control circuit.

Furthermore, according to the present invention, there is provided a light control circuit, further including a balancing circuit, operatively connected between the current-to-voltage converting circuit and the deviation calculation circuit, for outputting a balanced output between a predetermined level and an output from the current-to-voltage converting circuit of the first predetermined level. The deviation calculation circuit may be used for determining a first predetermined level during an adjustment time. The determined first predetermined level may be supplied to the balancing circuit as a reference value, and said deviation calculation calculation circuit functions as an amplifier, in a normal operation.

The predetermined levels may be defined with respect to another origin of the characteristic of the light emitting element where a current flowing through the light emitting element is near to a current providing the first predetermined level.

According to the present invention, there is provided a method for setting reference values of a light circuit including the following steps of: substantially disabling the deviation calculation circuit in the light control circuit; continuously changing a data through a first D/A converter until a read level of the light sensing element reaches the first predetermined level and determining a first reference value for the first predetermined level; energizing the superimposedly energizing circuit; continuously changing other data through a second D/A converter until a read level of the light sensing element reaches the second predetermined level and determining a second reference value for the second predetermined level; deenergizing the supeimposedly energizing circuit and setting the second reference value to a third D/A converter for an initial data; restoring the light control circuit and energizing the superimposedly energizing circuit; and, continuously decreasing the data for outputting from the third D/A converter until a read level of the light sensing element reaches the first predetermined level and determining a third reference value for the third reference value for the third reference level.

As a result, the predetermined levels are defined with respect to another origin of the characteristic of the light emitting element.

BRIEF DESCRIPTION OF THE DRAWINGS

Other objects and features of the present invention will be described in detail with reference to accompanying drawings, in which:

FIGS. 6a and 6b are flow charts illustrating a reference values determining operation of the light control circuit shown in FIG. 5;

DESCRIPTION OF THE PREFERRED EMBODIMENTS

A laser control circuit according to a first embodiment of the present invention will now be described in detail with reference to FIGS. 1 through 3.

Figure 1:
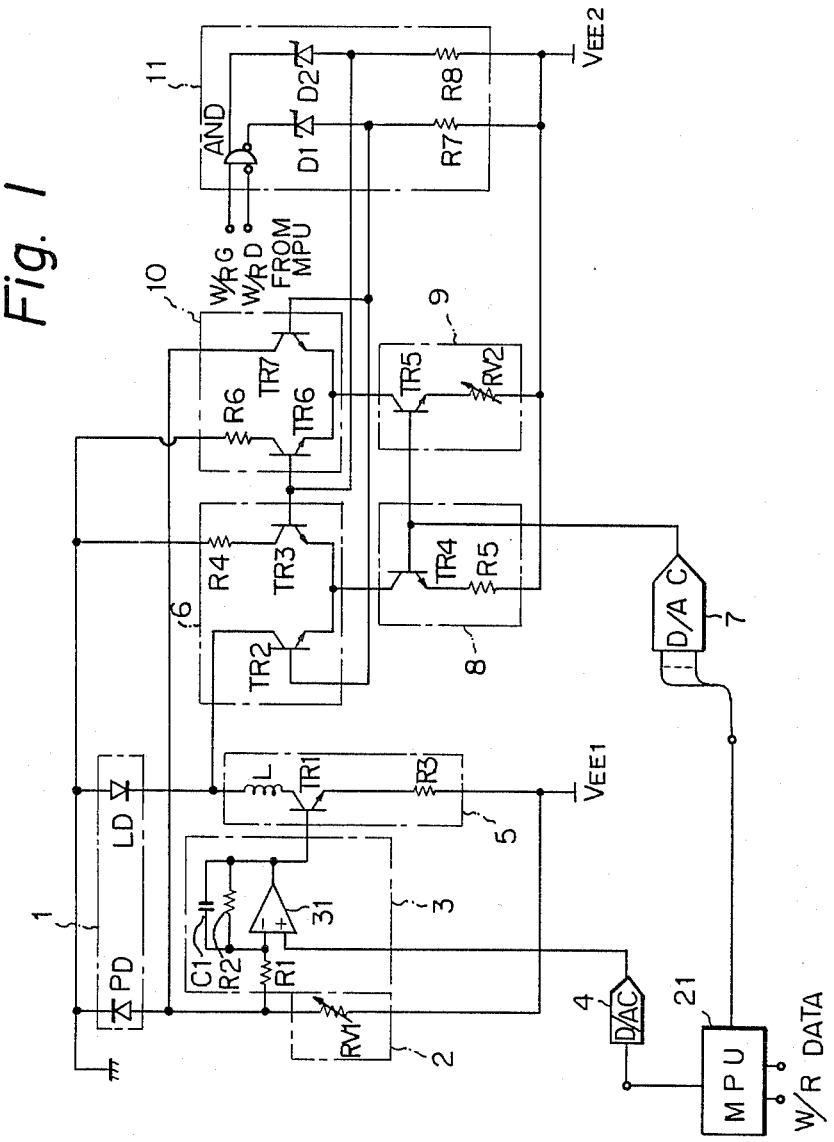
FIG. 1 is a circuit diagram of a light control circuit of an embodiment in accordance with the present invention.
Figure 2:
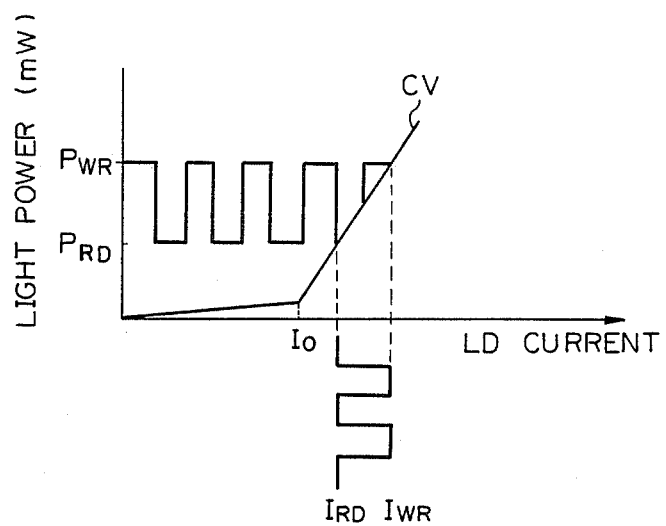
FIG. 2 is a graph illustrating the characteristic of a laser diode in FIG. 1.
Figure 3:
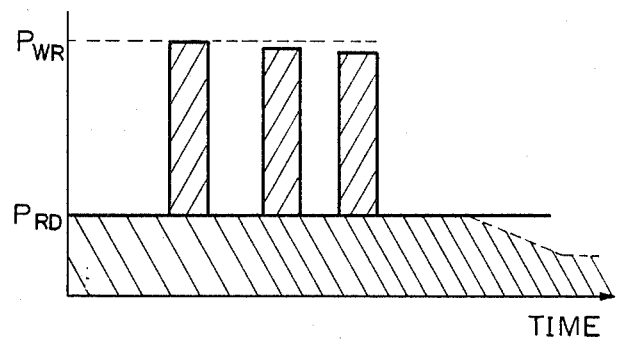
FIG. 3 is a graph representing a write power level and read power level of the laser diode.

FIG. 1 is a diagram illustrating a laser control circuit according to the first embodiment of the present invention, FIG. 2 is a graph illustrating the relationship between the driving current and emission quantity in a laser diode, and FIG. 3 is a graph illustrating the monitor voltage.

The circuit shown in FIG. 1 for controlling the driving of a laser diode in the optical disc system includes a laser diode (LD) unit 1, a photodiode (PD) current adjustment unit 2, a read power level detection unit 3, a D/A converter 4, a read power level current adjustment unit 5, a write power level current adjustment unit 6, a D/A converter 7, a write power level setting unit 8, a write power level current subtraction setting unit 9, a write power level current subtraction unit 10, a level shift unit 11, and a microprocessor unit (MPU) 21.

The laser diode unit 1 consists of a laser diode (hereinafter referred to as "LD") emitting beams of a read power level, for example, in a quantity corresponding to about 1 mW, and beams of a write power level, for example, in a quantity corresponding to 5 to 10 mW, and a photodiode (hereinafter referred to as "PD") monitoring the quantity of beams emitted from the LD. The photodiode current adjustment unit 2 comprises of a variable resistor RV1 for adjusting the monitoring current flowing through the PD to a predetermined value at the time of initial setting. The read power level detection unit 3 comprises an operational amplifier 31, fixed resistors R1 and R2, and a feedback capacitor C1. The read power level detection unit 3 detects a PD voltage from the photodiode current adjustment unit 2, and outputs a voltage corresponding to the read power level set by the D/A converter 4 in response to the detected PD voltage. The voltage output from the D/A converter 4, is, defined by the microprocessor unit 21 so that the output power of the LD provides the read power level. The read power level current adjustment unit 5 comprises a transistor TR1, a coil L, and a fixed resistor R3, and adjusts the driving current of the LD so that beams of the read power level are emitted therefrom. The write power level current adjustment unit 6 comprises two parallel-connected transistors TR2 and TR3 and a fixed resistor R4, and adjusts the driving current of the LD so that beams of the write power level are emitted therefrom. The transistors TR2 and TR3 are connected so that a differential operation is performed so as to realize a high-speed operation. The D/A converter 7 is set to a predetermined output by the microprocessor unit 21 so that the LD within the LD unit 1 emits light corresponding to the write power level. The write power level setting unit 8 comprises a transistor TR4 and a fixed resistor R5 and sets a reference write power level to the write power level current adjustment unit 6 so that the LD emits laser beams in response to the write power level set at the D/A converter 7. The write power level current subtraction setting unit 9 comprises a transistor TR5 and a variable resistor RV2 and sets a reference subtraction value corresponding to the output from the D/A converter to the write power level current subtraction unit 10. The write power level subtraction unit 10 comprises two transistors TR6 and TR7 and a fixed resistor R6, which are differentially connected so as to realize a high-speed operation, and this unit 10 subtracts the above set write power level current from the PD current on which the write power level current is superimposed the read power level current. The level shift unit 11 includes a logical product circuit AND, two zener diodes D1 and D2 and resistors R7 and R8 and adjusts the biases of the transistors TR2, TR3, and TR7 of the write power level current adjustment unit 6 and the write power level current subtraction unit 10 so that the write power level current adjustment unit 6 and the write power level subtraction unit 10 are operated according to the write data.

For example, the current supplied to the LD when writing data is applied in a pulse waveform as shown in FIG. 2. The ordinate of FIG. 2 indicates the emission quantity (mW) of the LD and the abscissa of FIG. 2 indicates the current applied to the LD. Reference symbol CV represents the inherent characteristic curve of the LD, reference symbol $P_{WR}$ represents the write power level, reference symbol $P_{RD}$ stands for the read power level, reference symbol $I_{WR}$ stands for the level of the current flowing in the LD when writing data, and reference symbol $I_{RD}$ represents the level of the current flowing in the LD when reading data.

The PD voltage obtained by monitoring the quantity of beams emitted from the LD by the PD has a waveform as shown in FIG. 3. Namely, the PD voltage has a waveform obtained by superimposing a pulse waveform having an amplitude of the write power level $P_{WR}$ on the constant read power level $P_{RD}$. When the write frequency is 3.7 MHz, the width of the write pulse is 50 to 70 nsec.

The LD has inherent characteristics, and if there are great changes in the write power level and read power level emitted from the LD, these have an adverse influence on the read and write data quality and the like. Accordingly, an initial setting is performed by adjusting the variable resistor RV1 of the PD current adjustment unit 2 so that a substantially constant write power level and read power level are always obtained irrespective of the characteristics of the LD. More specifically, the variable resistor RV1 is adjusted so that LD is caused to emit laser beams at a certain power by metering by means of a power meter or synchroscope corrected in the state completed as an optical head (not shown), the output voltage of the PD is maintained at a certain level, and the variable resistor RV1 is locked by a fixative, to fix it in this state.

In the circuit shown in FIG. 1, an automatic power control (APC) circuit includes the PD in the LD unit 1, the PD current adjustment unit 2, the read power level detection unit 3, and the D/A converter 4. More specifically, the reference value of the power level is applied to an non-inverted input terminal of an amplifier 31 from the D/A converter 4, and the detection value of the PD is applied to an inverted input terminal of the amplifier 31 as a feedback signal. Accordingly, the amplifier 31 supplies a current corresponding to the deviation of the detection value of the PD and the reference value to the LD in the LD unit 1 through the transistor TR1, and the LD is caused to emit laser beams having an amplitude corresponding to the reference value. In principle, since the LD is always actuated at the read power level, this operation of the APC is effected at the read power level.

Thus, the read power of the LD is provided through the read power level current adjustment unit 5 under the operation of the APC. The write power is obtained by additionally supplying a current, to be superimposed on the current flowing in the LD through the read power level current adjustment unit 5, through the write power level current adjustment unit 6, and the write power level setting unit 8. Namely, a control voltage capable of supplying a current to be superimposed as the write power level is given in advance from the transistor TR4 in the write power level setting unit 8 via the D/A converter 7. When writing data, by giving a write data signal W/RD and a write gate signal W/RG to the level shift unit 11 from MPU 21, the write power level current adjustment unit 6 is energized. More specifically, the transistor TR2 is turned ON. Thus, a current corresponding to the write power level, to be superimposed, flows through the LD, the transistor TR2, the transistor TR4, and the resistor R5, whereby the LD is caused to emit output beams of the predetermined write power level according to the write data.

When the operation of the APC at the time of writing the data is taken into consideration, the APC circuit, per se fulfills a control for obtaining the reference value set by the D/A converter 4, and therefore, if the LD is actuated at the above-mentioned write power level, the APC circuit reduces the current flowing through the LD via the transistor TR1 to obtain the read power level. At this time, the output beam amplitude of the LD is reduced to the read power level, and therefore, when writing data, output beams at the write power level cannot be obtained. To avoid this phenomenon, a means for by-passing the operation of the APC when writing data is adopted in the conventional circuit.

In the embodiment, the operation of the APC is continued even when writing data. More specifically, the write power level current subtracting setting unit 9 and the write power level current subtraction unit 10 are provided, and these circuits are actuated synchronously with the writing operation, and the reading of the PD corresponding to the current supplied to the LD when superimposed on the current corresponding to the write power level is subtracted through the transistor TR7 in the write power level current subtraction unit 10, the transistor TR5 in the write power level current subtraction setting unit 9 and the resistor RV2 from the current flowing through the PD and applying it to the read power level detection circuit 3. Of the reading of the PD, the current applied as the feedback signal to the inverted input terminal of the amplifier 31 in the read power level detection unit 3 corresponds to the read power level. As a result, even when writing data, the APC functions to maintain the read power level without any influence from the write pulse.

Where this automatic adjustment function is set so that the predetermined APC function is exerted, the voltage corresponding to the write power level, from which the current is to be subtracted, is applied to the transistor TR5 from the D/A converter 7, and the subtraction adjustment is achieved by adjusting the variable resistor RV2 in the write power level current subtraction setting unit 9, and to fix this state, the variable resistor RV2 is locked by a fixative.

Conversely, in the circuit shown in FIG. 1, an operation for locking the variable resistors is necessary, and the automation of a test, such as a printed circuit board test, becomes difficult. Furthermore, a reduction of the number of test steps and a reduction of the cost cannot be attained. If the LD is replaced or other LDs having other characteristics are used, the above troublesome adjustment is required.

Figure 4:
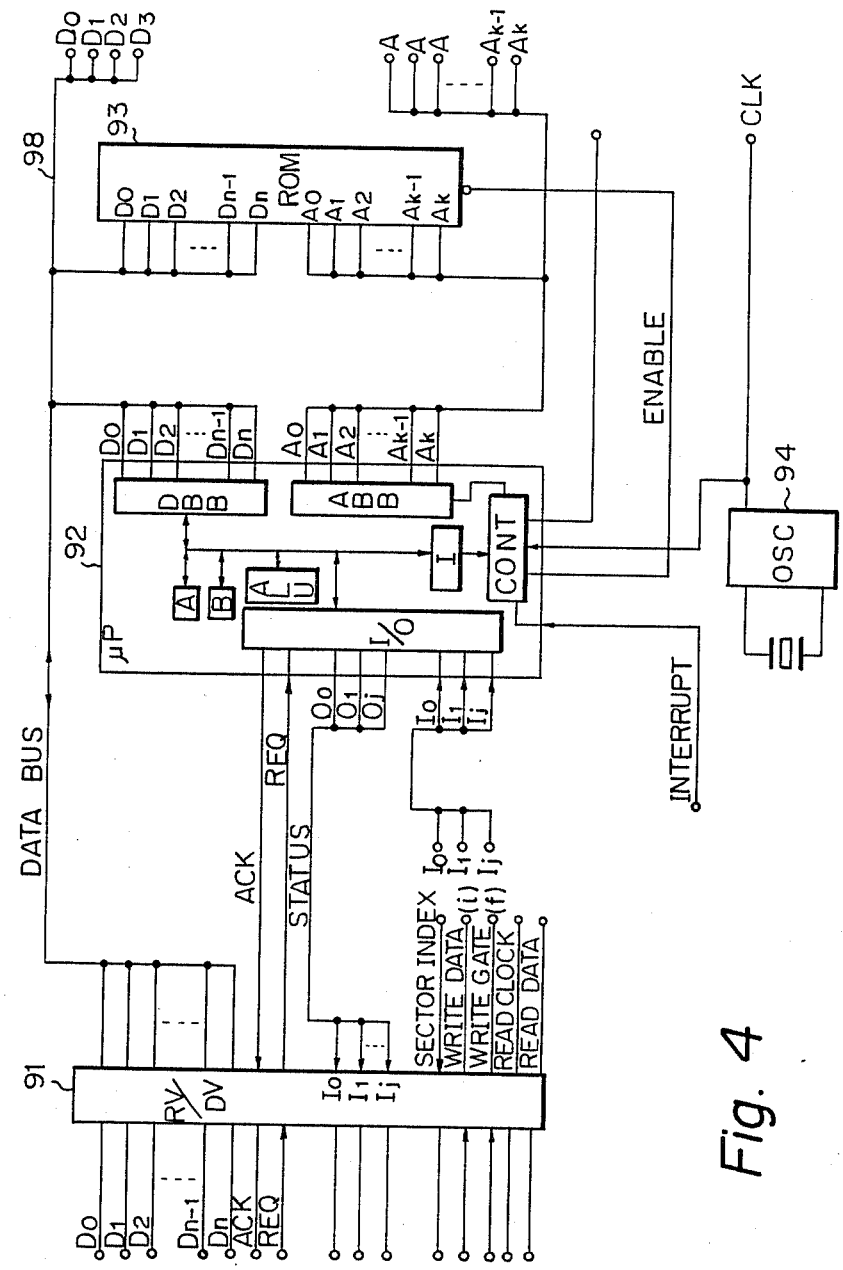
FIG. 4 is a circuit diagram of a microprocessor unit shown in FIG. 1.

MPU 21 sets the reference values through the D/A converters 4 and 7 and energizes the write power level current adjustment unit 6 and write power level current subtraction setting unit 10 through the level shift unit 11. MPU 21 has a structure shown in FIG. 4 and performs the above operation. The microprocessor 21 includes, for example, a data bus buffer DBB, an address bus buffer ABB, an A register, a B register, an arithmetic and logic unit ALU, an instruction register I, an input/output interface, and a control circuit CONT. The microprocessor 21 may be used, for example, Intel 8031. The ROM 93 stores programs tables of data for the above operation. The oscillator 94 generates a clock signal CLK which is applied to the control circuit CONT in the microprocessor 21.

The D/A converters 4 and 7 for setting the reference value may be replaced by variable resistors or the like. Furthermore, when the level shift unit 11 is directly driven by the write data, the MPU 21 can be omitted.

A second embodiment for solving the problem concerning the adjustment and fixation of the variable resistor RV2, which is involved in the first embodiment, will now be described with reference to FIG. 5.

Figure 5:
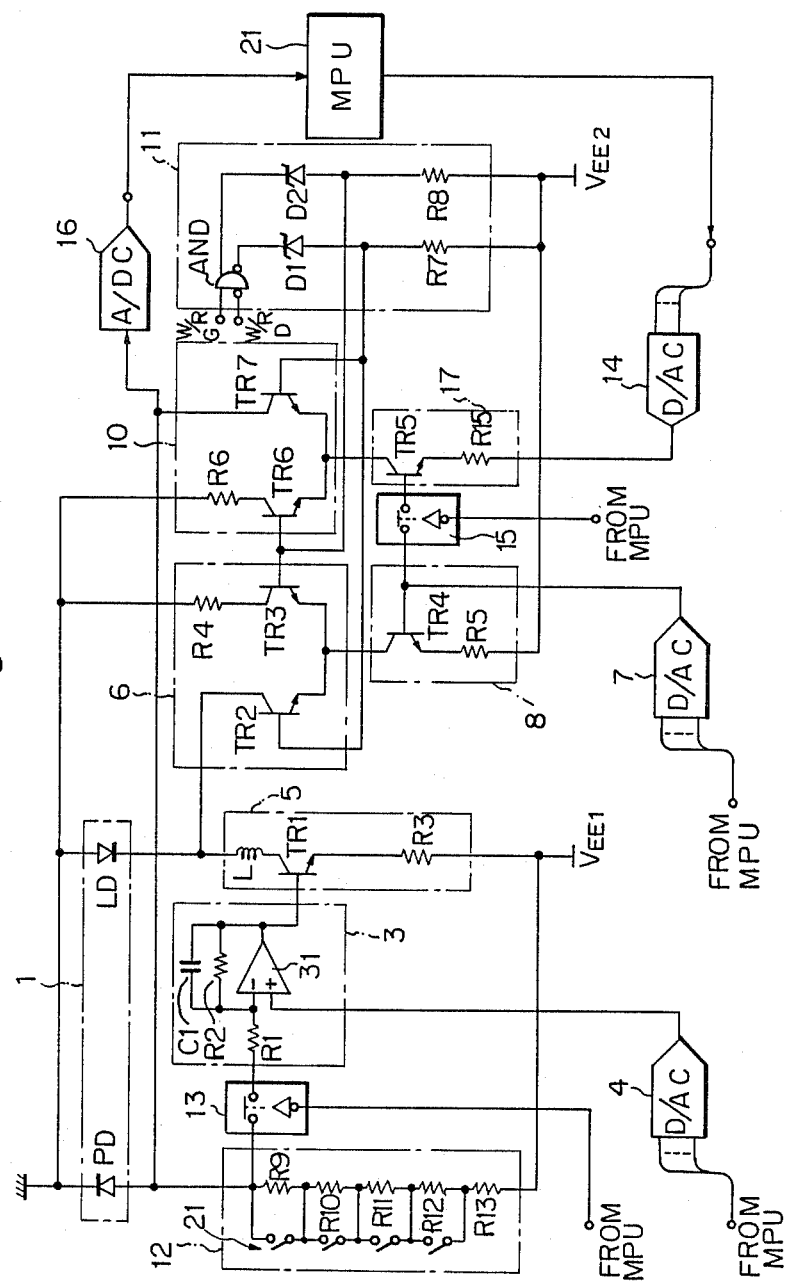
FIG. 5 is a circuit diagram of a light control circuit of another embodiment in accordance with the present invention.

FIG. 5 shows a light control circuit of the second embodiment. In addition to the circuit unit blocks 1 through 11 illustrated in FIG. 1, and except for the PD current adjustment unit 2, this control circuit includes, instead of the PD current adjustment unit 2, a PD currentvvoltage conversion unit 12 for converting the current flowing through the PD to a voltage at a predetermined ratio, and an analog switch 13 disposed between the PD current/voltage conversion unit 12 and the read power level detection circuit unit 3 to cut off the output of the PD current/voltage conversion unit 12 while the D/A converter 4 is set by the microprocessor unit (MPU) 21 at the PD voltage at which the output of an A/D converter 16 indicates the read power level, to thereby stop the function of the read power level detection unit 3. The control circuit shown in FIG. 5 further includes a D/A converter 14 set by the MPU 21 to determine the PD voltage value where the output of the A/D converter 16 indicates the read power level, an analog switch 15 disposed between the write power level setting unit 8 and the write power level current subtraction setting unit 17 to turn ON the operation of the write power level current subtraction setting unit 17 while the D/A converter 14 sets the PD voltage where the output value of the A/D converter 16 indicates the read power level, and the A/D converter 16 for setting the PD voltage at each time and informing the MPU 21 of the set PD voltage.

Note, the first automatic control, that is, read power level control, is accomplished by the read power level detection unit 3 and read power level current adjustment unit 5, and second automatic power control, that is, write power level control, is accomplished by the write power level setting unit 8 and write power level current subtraction setting unit 17.

The PD current/voltage conversion unit 12 includes fixed resistors R9 through R13 for converting the PD current to a voltage at a predetermined ratio and switches 21 for short-circuiting each of the fixed resistors R9 through R13, for example, duplex switches, short bars, or analog switches. In the embodiment illustrated in the drawings, duplex switches are used.

The fixed resistors R9 through R13 of the PD current/voltage conversion unit 12 are weighed by 1, 2, 4, 8 and 16, respectively, at the time of designing. ON-OFF setting of the switches 21 is effected when assembling the system or before a test. More specifically, the emission power of the LD and the PD currents differ among the LD units 1, and because of large errors, these elements cannot be directly used. Accordingly, the characteristics are determined in advance, and based on the characteristic data, the combination of the preliminarily weighed resistance values of the fixed resistors R9 through R12 is determined by the switches 21 so that the output voltage of the PD upon emission with a certain power, that is, the value set at the A/D converter 16 by the A/D conversion, is kept constant. Thus, the relationship between the emission power of the LD and the PD voltage is determined so that, for example, when the emission power is 1 mW, the PD voltage is 0.5 V. Since the emission power and the PD current are in a 1 to 1 correspondence, as the emission power is changed, a corresponding PD voltage is obtained.

The foregoing processes are carried out before the delivery of products, and the following processes may be made when the system is actually used, for example, when the power source is turned ON or when an optical disc is exchanged.

The first automatic power control, i.e. the above APC, processing unit having a function of automatically adjusting the emission power of the PD by the feedback of the read power level, such as the read power level direction unit 3 or read power level current adjustment unit 5, that is, the first APC processing unit which acts so that when the emission power of the LD is changed by a rise in the temperature or the like, as indicated by the dot line in FIG. 3, the change is cancelled to return the dot line to the solid line in FIG. 3, is turned OFF by the analog switch 13.

Note, the analog switch 13 is turned ON and OFF by the microprocessor 21. Furthermore, while the function of the first APC processing unit is turned OFF by the analog switch 13, the MPU 21 sets data to the D/A converter 4 so that a value converted by the A/D converter 16 is equal to the PD voltage indicating the specified power of about 1 mW for reading. The set value of the D/A converter 4 is supplied to the base of the transistor TR1 through the operational amplifier 31 acting as a voltage follower when the APC is OFF, whereby the transistor TR1 is turned ON and the emitter voltage, voltage VEE1, and the current determined by the fixed resistor R3 are supplied to the LD to realize the first APC process.

The operation of adjusting the emission power at the write power level will now be described. In this case, since a power capable of writing of data is output, the power level is defocussed so that data writing becomes impossible.

Since pulse modulation of the emission is effected when writing data, as shown in FIG. 2, the PD voltage is determined according to the duty cycle ratio of the pulse. For example, where the pulse emission power is 10 mW and the duty ratio is 50%, and the read power is 1 mW at 0.5 V/mW, the PD voltage is determined as follows:

$$\{[(10 \text{ mW} - 1 \text{ mW})/2] \ 1 \text{ mW}\} \times 0.5 = 2.75 \text{ V}.$$

The value of the D/A converter 7 is set by the MPU 21 so that the output of the A/D converter 16 becomes equal to this value. Note, the write power level is changed by proportionally changing this value.

Then, the write power level current subtraction unit 10 for subtracting the current corresponding to the superimposed write power level emission from the PD current is actuated. More specifically, the analog switch 15 is turned ON and the second APC unit including the write power level current subtraction setting unit 17 is turned ON, and the set value of the D/A converter 14 is determined so that the value of the A/D converter 16 indicates the PD voltage of the read power level. Note, this voltage value is 0.5 V.

Finally, the first APC processing unit is turned ON and the set value of the D/A converter 14 is adjusted again, whereby the output value of the A/D converter 16 is equal to the read power level value of 0.5 V.

As shown in FIG. 5, the MPU 21 receives the data of the A/D converter 16, gives predetermined set values to the D/A converters 4, 7, and 14, actuates the analog switches 13 and 15, and gives the write gate signal W/RG and write data signal W/RD to the level shift circuit unit 11. The operations of MPU 21 and the circuit shown in FIG. 5 will now be described with reference to the flow chart of FIG. 6.

Step 001 (S001)
MPU 21 turns OFF the analog switch 13 to turn OFF the APC, whereby the amplifier 31 is maintained as a voltage follower and the input voltage applied to the non-inverted input terminal is directly output.

Step 002 (S002)
The read output data of the D/A converter 4 is initially set at zero (0).

Step 003 (S003)
The D/A converter 4 applies the analog voltage based on the output data to the non-inverted input terminal of the amplifier 31. The voltage of the applied polarity is applied from the amplifier 31 to the base of the transistor TR1. Where the output voltage of the D/A converter 4 is zero, the transistor TR1 is turned OFF and the LD is not energized. As the output voltage of the D/A converter 4 is increased, as described below, the LD emits beams in an amplitude corresponding to the output voltage of the D/A converter 4.

Step 004 (S004)
The emitted light of the LD is detected by the PD and the detected value is converted to a digital value by the A/D converter 16 and supplied to the MPU 21.

Steps 005 and 006 (S005 and S006)
MPU 21 determined whether or not the A/D-converted detected value of the PD has reached the read power level. If the detected value has not reached the read power level, 1 is added to the output data of the D/A converter 4 and the routine returns to step 003 (S003). The operations of steps S003 through S006 are repeated until the detected value of the PD reaches the read power level.

Step 010 (S010)
When the detected value of PD reaches the read power level, the MPU 21 supplies such an output to the AND gate of the level shift unit 11 that the write gate signal W/RG is turned ON and the write data signal W/RD is turned ON, whereby the write power level current adjustment unit 6 and write power level setting unit 10 are energized through the level shift unit 11. Namely, the transistors TR2 and TR7 are turned ON, and through the transistor TR2, the LD is placed in the state where emission to the write power level is possible. Note that a read power level reference value determined by through the above procedures is supplied to the non-inverted terminal of the amplifier 31 through the D/A converter 4.

Step 011 (S011)
The MPU 21 sets an initial write output data, i.e. zero, to the D/A converter 7.

Step 012 (S012)
The analog voltage based on the write output data is applied to the gate of the transistor TR4 of the write power level setting unit 8 through the D/A converter 7, whereby the write current is supplied to the LD through the transistor TR2 of the write power level current adjustment unit 6 and the LD is energized to emit laser beams at a level exceeding the read power level.

Step 013 (S013)
The emitted light of LD is detected by the PD and the detected value is converted to a digital value by the A/D converter 16 and supplied to MPU 21.

Steps 014 and 015 (S014 and S015)
MPU 21 determines whether or not the detected value of the PD has reached the write power level. If the detected value has not reached the write power level, 1 is added to the write output data of the D/A converter 7 and the routine returns to step S012. The operations of steps S012 through S015 are then repeated until the detected value of the PD reaches the write power level. By through the above operation, a write power level reference value is determined. The determined reference value is output from the D/A converter 7.

Step 020 (S020)
When the detected value of the PD reaches the write power level, the MPU 21 sets the same value as the final write data of the D/A converter 7 at the D/A converter 14, whereby a state is attained wherein, when writing data, the amplitude of the write pulse shown in FIG. 3 can be subtracted from the write power level current subtraction unit 10 through the write power level current subtraction setting unit 17.

Step 021 (S021)
The MPU 21 turns ON the analog switch 15 to actuate the write power level current subtraction setting unit 17 and write power level current subtraction unit 10.

Step 022 (S022)
The D/A converter 14 supplies the analog voltage based on the write output data to the transistor TR5 of the write power level current subtraction setting unit 17 to subtract the superimposed write current. According to the output voltage of the D/A converter 14, the LD emits laser beams at the subtracted current, i.e., at the read power level.

Step 023 (S023)
The light emitted from the LD is detected by the PD, and the detected value is converted to a digital value by the A/D converter 16 and supplied to the MPU 21.

Steps 024 and 025 (S024 and S025)
The MPU 21 determines whether or not the detected value of the PD has been reduced to the rad power level, and if the detected value is not reduced to the read power level, 1 is subtracted from the output data of the D/A converter 14 and the routine returns to step S022. The operations of steps S022 through S025 are repeated until the detected value of PD is reduced to the read power level.

Step 030 (S030)

If the detected value of PD is reduced to the read power level, the MPU 21 applies an output to the AND gate of the level shift unit 11 such that the write gate signal W/RG is turned OFF and the write data signal W/RD is turned OFF to deenergize the write power level current adjustment unit 6 and write power level setting unit 10.

Step 031 (S031)

By automatically setting the read power level and write power levels by the foregoing operations, the MPU 21 turns ON the analog switch 13, and accordingly, turns ON the APC.

In brief, when the APC is turned OFF (S001), the read power level is determined (S002 through S006) and the write power level is determined (S010 through S015), and the so-determined reference values of the read power level, the write power level and the subtraction current are set at the D/A converters 4, 7, and 14. After the reference values are automatically determined in the foregoing manner, the APC is turned ON and the normal operation becomes possible.

According to the above-mentioned embodiment, automation of the test of the laser control circuit, reduction of the number of test steps, and a reduction of the cost can be easily accomplished. Moreover, according to the present embodiment, an exchange of LD units can be easily performed and a predetermined emission power can be always obtained.

Another embodiment of the present invention will now be described with reference to FIG. 7.

Figure 7:
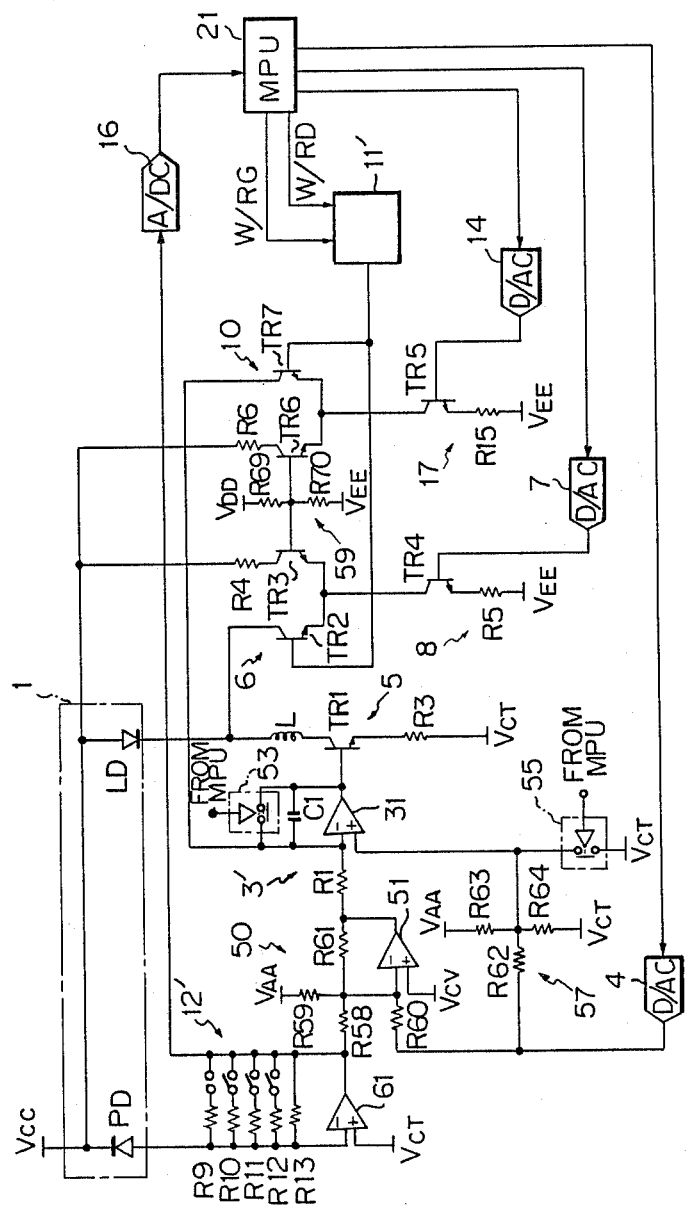
FIG. 7 is a circuit diagram of a light control circuit of still another embodiment in accordance with the present invention; and, FIGS. 8a and 8b are flow charts representing a reference value determining operation of the light control circuit shown in FIG. 7.

In a light control circuit shown in FIG. 7, analog switches 53 and 55 and a PD current adjustment unit 12' are arranged instead of the analog switches 13 and 15 and the PD current adjustment unit 12 of the laser control circuit shown in FIG. 5. A balancing circuit 50 including resistors R58 through R61 and an operational amplifier 51 are arranged between the PD current adjustment unit 12' and read power level detection unit 3'. The A/D converter 16 is not directly connected to the PD but is connected to the output terminal of the PD current adjustment unit 12'. Furthermore, the transistor TR7 of the write power level current subtraction unit 10 is not directly connected to PD but is connected to the input terminal of the amplifier 31. The D/A counter 4 is connected to the non-inverted input terminal of the amplifier 31 through a resistor R62 and is also connected to the reversible input terminal of the amplifier 51 through the resistor R60.

In FIG. 5, the embodiment in which a positive and negative bipolar power source is used is illustrated. However, in the present embodiment, a monopolar power source is used. For example, the power source voltages are 12 V ($V_{CC}$), 10 V ($V_{AA}$), 5 V ($V_{CT}$), 5 V ($V_{DD}$) and 0 V ($V_{EE}$). $V_{CT}$ corresponds to the ground level in FIG. 5. Since the monopolar power source are used, resistors R63 and R64 of resistance nets 59 and 57 are additionally disposed. Moreover, since the monopolar power source is used, the internal circuit of the level shift unit 11' is different from that shown in FIG. 5, but since the operation principle is the same as in FIG. 5, an explanation thereof is omitted.

Other circuit arrangements are the same as in the circuit shown in FIG. 5.

The operations of the control circuit shown in FIG. 7 will now be described with reference to the flow chart of FIG. 8.

Step 100 (S100)

MPU 21 turns ON the analog switch 53, whereby a capacitor C1 connected in parallel to the amplifier 31 is by-passed from the amplifier 31 and the amplifier 31 is caused to act as a voltage follower. Namely, the voltage applied to the non-inverted input terminal of the amplifier 31 is applied to the transistor TR1 through the amplifier 31.

Step 101 (S101)

MPU 21 turns OFF the analog switch 55, whereby the output of the D/A converter 4 is applied to the non-inverted input terminal of the amplifier 31 through the resistor R62 of the resistance network 57.

Step 102 (S102)

The read output data of the D/A converter 4 is initially set at zero.

Step 103 (S103)

The D/A converter 4 applies the analog output voltage based on the read output data to the non-inverted input terminal of the amplifier 31. Since the amplifier 31 is in the state as the voltage follower, the applied analog voltage is applied to the gate of the transistor TR1. Accordingly, the transistor TR1 is driven by the analog output voltage from the D/A converter 4 and the LD is caused to emit laser beams in the power level corresponding to the analog output voltage from the D/A converter 4.

Step 104 (S104)

The light emitted from LD is detected by the PD, and the detected value is converted to a digital quantity by the A/D converter 16 and is supplied to the MPU 21.

Steps 105 and 106 (S105 and S106)

The MPU 21 determines whether or not the A/D-converted value of PD has reached the read power level. If the detected value of PD has not reached the read power level, 1 is added to the read data of the D/A converter 4 and the routine returns to step S103. The operations of steps S103 through S106 are repeated until the detected value of the PD reaches the read power level.

The foregoing operations are the same as the above-mentioned operations of steps S002 through S006. In short, the read power level is determined by the foregoing operations.

Step 110 (S110)

When the detected value of the PD arrives at the read power level, the MPU 21 applies an output to the AND gate of the level shift unit 11' such that the write data signal W/RD is turned ON and the write gate signal W/RG is turned ON, and the transistor TR2 of the write power level current adjustment unit 6 and the transistor TR7 of the write power level setting unit are turned ON through the level shift unit 11', whereby the state is attained where the LD can emit laser beams to the write power level through the transistor TR2.

Note that a read power level reference value determined above is supplied to the non-inverted input terminal of the amplifier 31.

Step 111 (S111)

The MPU 21 sets an initial write data, i.e. zero, to the D/A converter 7.

Step 112 (S112)

The analog voltage based on the write output data is applied to the gate of the transistor TR4 of the power level setting unit 8 through the D/A converter 7. The current corresponding to the voltage applied to the gate of the transistor TR4 flows through the LD, the transistor TR2, the transistor TR4, and the resistor R5 to cause the LD to emit laser beams at a level exceeding the read power level.

Step 113 (S113)

The light emitted from the LD is detected by the PD, and the detected value is converted by the A/D converter 16 and supplied to MPU 21. The transistor TR7 in the write power level current subtraction unit 10 is not directly connected to the PD and the A/D converter 16 makes the A/D conversion of the reading of the PD where subtraction of the current is not performed.

Steps 114 and 115 (S114 and S115)

The MPU 21 determines whether or not the detected value of PD has reached the write power level. If the detected value of PD has not reached the write power level, 1 is added to the write out data of the D/A converter 7 and the routine returns to step S112. The operations of steps S112 through S115 are repeated until the detected value arrives at the write power level.

The foregoing operations of steps S110 through S115 are substantially the same as the above-mentioned operations of steps S010 through S015. By these operations, a write power level reference value is determined and the determined write power level reference value is output from the D/A converter 7.

Step 120 (S120)

The MPU 21 turns OFF the write gate signal W/RG and turns OFF the write data signal W/RD to deenergize the write power level current adjustment unit 6 and write power level setting unit 17 through the level shift 11', and therefore, the LD is not allowed to emit laser beams at the write power level but is caused to emit laser beams at the reference read power level given to the amplifier 31 from the D/A converter 4.

Steps 121 through 123 (S121 trough S123)

MPU 21 drives the D/A converter 7 so that the output value of the D/A converter 4 is at the read power level. Furthermore, the analog switch 55 is turned ON by the MPU 21 to drop the voltage of the non-inverted input terminal of the amplifier 31 to the level $V_{CT}$. On the other hand, the analog switch 53 is turned OFF to bring the capacitor Cl connected in parallel to the amplifier 31 into the operation-possible state, whereby the APC circuit is actuated.

The operations of the PD current adjustment unit 2', balancing circuit 50, and read power level detection unit 3', which constitute the APC circuit, will now be described. The reference value of the read power level is applied to the inverted input terminal of the amplifier 51 through the resistor R60 from the D/A converter 4. On the other hand, the detected value of the PD is applied to the balancing circuit 50 through the PD current adjustment unit 2'. The balancing circuit 50 acts so that when the reference value from the D/A converter 4 reaches agreement with the detected value of the PD, the output is reduced to zero when balancing. The output from the balancing circuit 50 is applied to the read power level current adjustment unit 5 through the read power level detection unit 3' to automatically adjust LD at the reference read power level.

Step 124 (S124)

The MPU 21 energizes the write power level current adjustment unit 6 again through the level shift unit 11', whereby the LD is caused to emit laser beams at the reference write power level determined at steps through S112 through S115 and output from the D/A converter 7.

It must be noted that the present embodiment is different from the above-mentioned embodiment in that, at this point, the APC circuit functions. Namely, since the APC circuit performs the APC function at the read power level, if the LD emits laser beams at the write power level, the APC circuit reduces the emission level to the read power level, with the result that the output level of the LD is reduced, irrespective of the write mode.

Steps 130 through 134 (S130 through S134)

The MPU 21 sequentially renews the quantity of the superimposing write power level to be subtracted from the reading of the PD through the D/A converter 14 from an output of the balancing circuit 50. The reading of the PD after subtraction of the superimposed write power level is A/D-converted by the A/D converter 16, and the foregoing operations are repeated until the value obtained by the conversion is restored to the read power level. By detecting the restoration to the read power level, a reference value of the subtraction value at the D/A converter 14 is determined.

Step 135 (S135)

The write circuits 6 and 10 are deenergized through the level shift unit 11'.

By the foregoing operations, the reference read power level value, reference write power level value and reference current subtraction value are automatically determined, and these values are output from the D/A converters 4, 7 and 14, respectively.

Figure 6A:
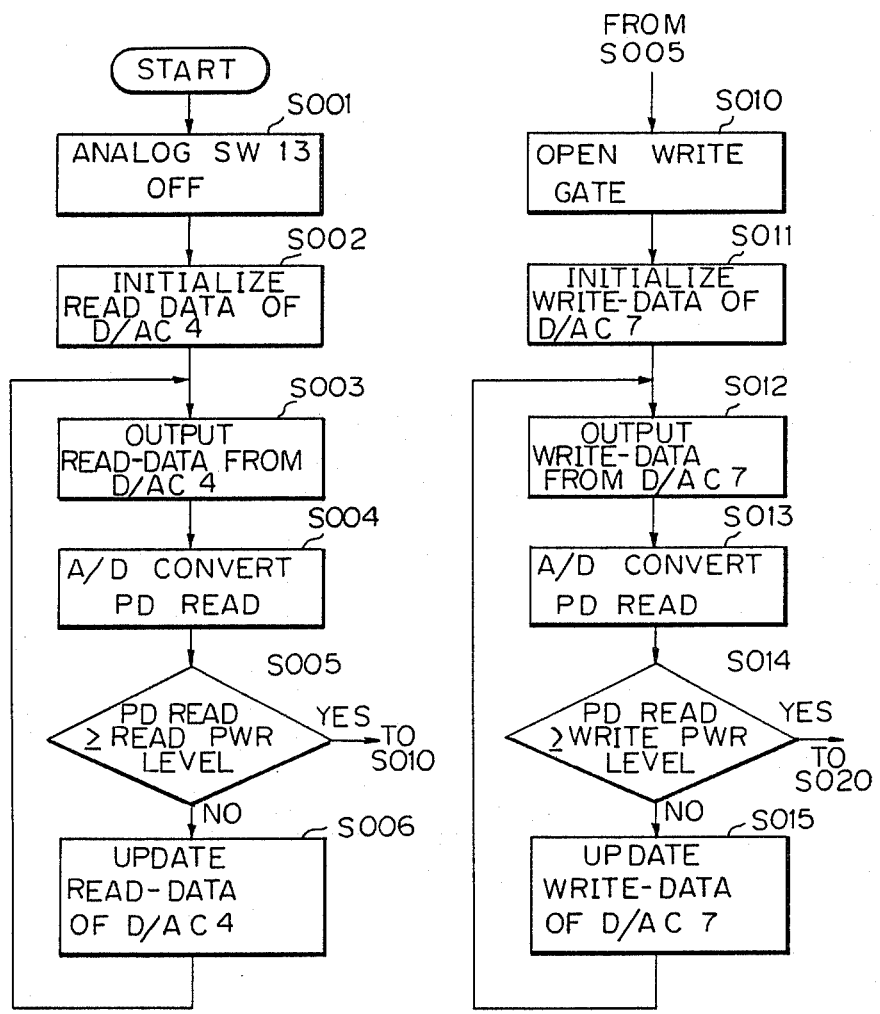
Figure 8A:
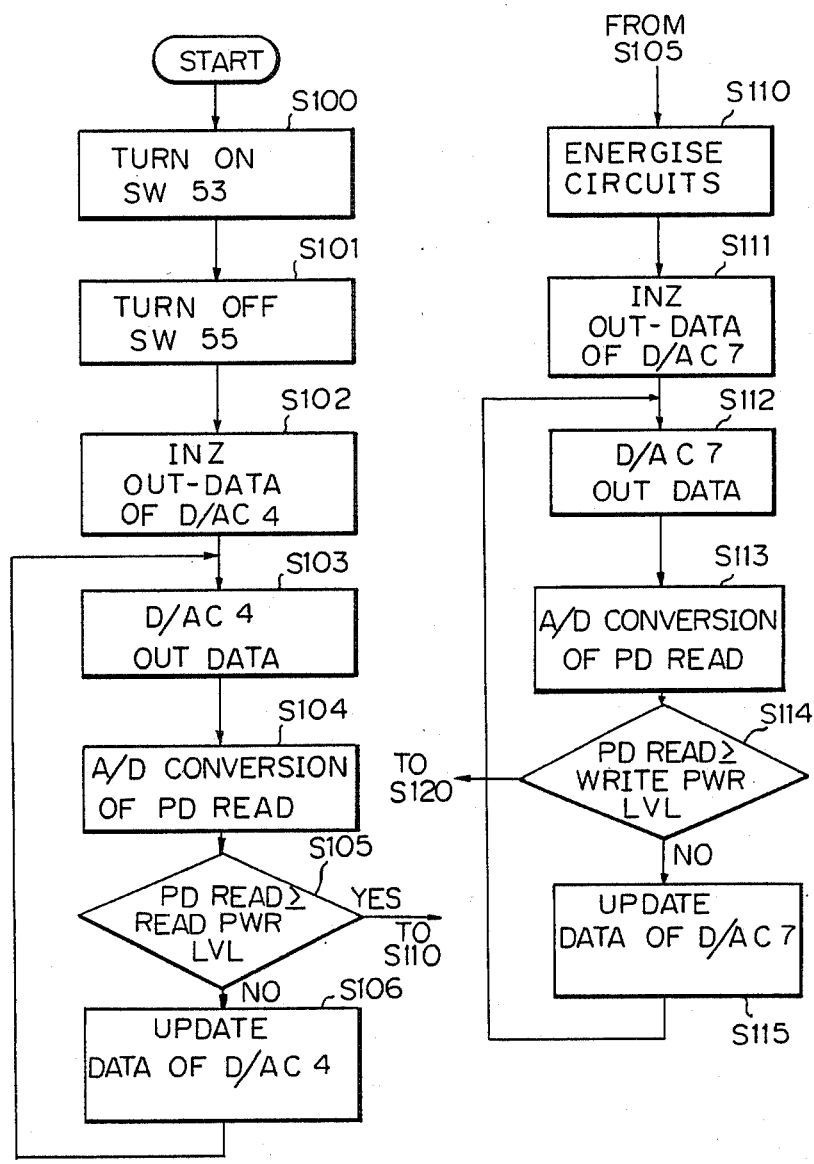

The present embodiment shown in FIGS. 7, 8a and 8b will now be compared with the embodiment shown in FIGS. 5, 6a and 6b, with reference to the characteristic diagram of FIG. 2.

In the embodiment shown in FIG. 5, for example, when the read current $I_{RD}$ corresponding to the read power level $P_{RD}$ of 1.0 mW is 55 mA and the write current $I_{WR}$ corresponding to the write power level $P_{WR}$ of 10 mW is 75 mA, the D/A converter 4 outputs a voltage corresponding to 55 mA and the D/A converter 7 outputs a voltage corresponding to 75 mA.

On the other hand, in the present embodiment, of the curve CV shown in FIG. 2, the portion of a gentle inclination which is not used for the read/write emission is omitted because the portion is not utilized for setting the D/A converters. Namely, in the present embodiment, if the reference current $I_0$ is 50 mA, a voltage corresponding to about 5 mA is output from the D/A converter 4 and a voltage corresponding to about 25 mA is output from the D/A converter 7. Therefore, in anticipation of a margin, the full span of the D/A converter 4 is adjusted to the quantity corresponding to 10 mA and full span of the D/A converter 7 is adjusted to the quantity corresponding to 40 mA. In contrast, in the embodiment shown in FIG. 5, the full span of the D/A converter 4 should be adjusted to the quantity corresponding to 40 mA and full span should be adjusted to the quantity corresponding to 100 mA, if the D/A converters having the same bit length are used. Therefore, in the present embodiment shown in FIG. 7, the resolving power per bit is improved to ¼ in the D/A converter 4 and to 2/5 in the D/A converter 7. Accordingly, a precise control of the read power level is especially improved in the present embodiment.

In the above embodiments, the laser diode as the light emitting element and the photodiode as the light sensing element are used, however, other types of light emitting elements and light sensing elements can be applied.

Many widely different embodiments of the present invention may be constructed without departing from the spirit and scope of the present invention. It should be understood that the present invention is not limited to the specific embodiments described in this specification, except as defined in the appended claims.

What is claimed is:

1. A light control circuit of an optical disc system having an optical disc storing data, a light emitting element used for writing data to and reading data from the optical disc, and a light sensing element sensing light from the light emitting element, comprising:

light control means, operatively connected to the light emitting element and the light sensing element, for energizing the light emitting element and for controlling a light level of the light emitting element at a first predetermined level sufficient for reading data from the optical disc in response to a signal from the light sensing element;

energizing means, operatively connected to the light emitting element and said light control means, for energizing the light emitting element in cooperation with said light control means, at a second predetermined level sufficient for writing data in the optical disc, when data is written to the optical disc; and subtracting means, operatively connected to the light sensing element and to said light control means in parallel, being synchronously operable with said energizing means, for subtracting a third predetermined level from the signal from the light sensing element.

2. A light control circuit according to claim 1, wherein the light emitting element comprises a laser diode having a substantially linear characteristic with respect to a current flowing therethrough and an amplitude of light emitted therefrom, and said first and second predetermined levels being defined on said substantially linear line, and said substantially linear characteristic being biased from an origin.

3. A light control circuit according to claim 2, wherein the light sensing element comprises a photodiode.

4. A light control circuit according to claim 3, wherein the laser diode and the photodiode are incorporated in a unit with a hermetic seal.

5. A light control circuit according to claim 1, wherein said light control means comprises:

converting means for converting a current flowing through the light sensing element to a corresponding voltage;

deviation calculation means for receiving said voltage from said converting means and said first predetermined level and for calculating a deviation between said voltage and said first predetermined level; and current giving means for providing a current corresponding to said deviation from said deviation calculation means to the light emitting element, so that the light emitting element emits light having an amplitude corresponding to said first predetermined level.

6. A light control circuit according to claim 5, wherein said converting means comprises a variable resistor.

7. A light control circuit according to claim 6, wherein said current giving means comprises a first transistor having a control terminal connected to receive said deviation and another terminal connected to the light emitting element.

8. A light control circuit according to claim 7, wherein said energizing means comprises:

second and third transistors having respective control terminals energized in response to data being written to the optical disk, having respective common terminals commonly connected, another terminal of one of said second and third transistors being connected to a first terminal of the light emitting element and to said current giving means, and another terminal of the other one of said second and third transistors being connected to a second terminal of the light emitting element.

9. A light control circuit according to claim 8, wherein said energizing means further comprises a fourth transistor having a first terminal connected to said common terminals or said second and third transistors and a control terminal connected to receive a voltage corresponding to said second predetermined level.

10. A light control circuit according to claim 9, wherein said subtracting means comprises:

fifth and sixth transistors having respective control terminals energized in response to data being written to the optical disk, having respective common terminals commonly connected, another terminal of one of said fifth and sixth transistors being connected to a first terminal of said light sensing element, and another terminal of another one of said fifth and sixth transistors being connected to the second terminal of the light emitting element.

11. A light circuit according to claim 10, wherein said subtracting means further comprises a seventh transistor having a first terminal connected to said common terminals of said fifth and sixth transistors, and a control terminal connected to receive a voltage corresponding to said third predetermined level.

12. A light control circuit according to claim 5, wherein said converting circuit comprises a plurality of switches and a plurality of resistors connected to respective ones of said switches.

13. A light control circuit according to claim 12, wherein said energizing means comprises:

second and third transistors having respective control terminals energized in response to data being written to the optical disk, having respective common terminals commonly connected, another terminal of one of said second and third transistors being connected to a first terminal of the light emitting element and to said current giving means, and another terminal of the other one of said second and third transistors being connected to a second terminal of the light emitting element.

14. A light control circuit according to claim 13, wherein said energizing means further comprises a fourth transistor having a first terminal connected to said common terminals of said second and third transistors and a control terminal connected to receive a voltage corresponding to said second predetermined level.

15. A light control circuit according to claim 14, wherein said subtracting means comprises:

fifth and sixth transistors having respective control terminals energized in response to data being written to the optical disk, having respective common terminals commonly connected, another terminal of one of said fifth and sixth transistors being connected to a first terminal of said light sensing element, and another terminal of another one of said fifth and sixth transistors being connected to the second terminal of the light emitting element.

16. A light control circuit according to claim 15, wherein said subtracting means further comprises a seventh transistor having a first terminal connected to said common terminals of said fifth and sixth transistors, and a control terminal connected to receive a voltage corresponding to said third predetermined level.

17. A light control circuit according to claim 1, wherein the light emitting element has a variable characteristic and said control circuit further comprises:
reference value setting means, operatively connected to said light control means, to said energizing means, to said subtracting means and to the light sensing element, for continuously determining said first, said second and said third predetermined levels in response to the variable characteristic of the light emitting element and for providing first, said second and said third predetermined levels at an adjustment time which is not a normal operation time.

18. A light control circuit according to claim 17, wherein said reference value setting means includes:
processor means;
analog-to-digital converter means for converting said voltage of the light sensing element to a digital value and for outputting same to said processor means; and
digital-to-analog converter means for outputting said first, said second and said third predetermined values corresponding to data from said processor means,
said processor means including means for determining said first, said second and said third predetermined values by providing data to said digital-to-analog converter means and by sensing said voltage of the light sensing element in accordance with a predetermined operation sequence.

19. A light control circuit according to claim 18, wherein said reference value setting means further includes:
switching means for substantially disabling and restoring said light control means; and
another switching means for de-energizing and energizing said energizing means and said subtracting means.

20. A light control circuit according to claim 1, wherein the light emitting element has a variable characteristic and said control circuit further comprising:
reference value setting means, operatively connected to said light control means, to said energizing means, to said subtracting means and to the light sensing element, for continuously determining said first, and second and said third predetermined levels in response to the variable characteristic of the light emitting element and for providing said first, said second and said third predetermined levels at an adjustment time which is not a normal operation time; and
balancing means, operatively connected between said converting means and said deviation calculation means, for outputting a balanced output having a level between a predetermined level and an output from said converting means at said first predetermined level, and wherein said deviation calculation means includes means for determining a first predetermined level during the adjustment time,
said determined first predetermined level being supplied to said balancing means as a reference value.

21. A light control circuit according to claim 20, wherein said reference value setting means includes:
processor means;
analog-to-digital converter means for converting said voltage of the light sensing element to a digital value and for outputting same to said processor means; and
digital-to-analog converter means for outputting said first, said second and said third predetermined values corresponding to data from said processor means,
said processor means including means for determining said first, said second and said third predetermined values by providing data to said digital-to-analog converter means and by sensing said voltage of the light sensing element in accordance with a predetermined operation sequence.

22. A light control circuit according to claim 21, wherein said reference value setting means further includes:
switching means for substantially disabling and restoring said light control means; and
another switching means for de-energizing and energizing said energizing means and said subtracting means.

23. A light control circuit according to claim 22, wherein said balancing means includes:
a resistor connected to said means; and
an amplifier having an input terminal connected to said resistor and another input terminal having an inverted polarity to said input terminal and connected to receive said first predetermined level and an output terminal connected to said deviation calculation means.

24. A method for setting reference values of a light control circuit including a light controlling means for controlling a light level emitted by a light emitting means in accordance with first data and second data, first D/A means operatively connected to the light control means for receiving the first data, light sensing means for sensing a level of light provided by the light emitting means, energizing means operatively connected to the light control means for energizing the light control means in accordance with the second data, second D/A means operatively connected to the energizing means, for providing the second data, subtracting means for subtracting a level of light sensed by the light sensing means and a level of light emitted from the light emitting means, in response to third data, third D/A means, operatively connected to the subtracting means, for providing the third data, said method comprising the following steps:
substantially disabling the light control means;
continuously changing the first data applied to the first D/A converter means until a read level of the light sensing means reaches said a predetermined level and determining a first reference value for said first predetermined level;
energizing the energizing means;
continuously changing the first data applied to the first D/A converter means until a read level of said light sensing means reaches said a predetermined level and determining a first reference value for said first predetermined level;
energizing the energizing means;
continuously changing second data applied to the second D/A converter means until a read level of the light sensing means reaches a second predetermined level and determining a second reference value for said second predetermined level;
continuously changing second data applied to the second D/A converter means until a read level of the light sensing means reaches a second predetermined level and determining a second reference value for said second predetermined level;
energizing the subtracting means and applying said second reference value to the third D/A converter means to provide the third data;
continuously decreasing the third data until a read level of the light sensing means reaches said first predetermined level and determining a third reference value for said third reference level; and
restoring the operation of the light control means.

25. A method for setting reference values of a light control circuit, including a light controlling means for controlling a light level emitted by a light emitting means in accordance with first data and second data, first D/A means operatively connected to the light control means for receiving the first data, light sensing means for sensing a level of light provided by the light emitting means, energizing means operatively connected to the light control means for energizing the light control means in accordance with the second data, second D/A means operatively connected to the energizing means, for providing the second data, subtracting means for subtracting a level of light sensed by the light sensing means and a level of light emitted from the light emitting means, in response to third data, third D/A means, operatively connected to the subtracting means, for providing the third data, said method comprising the following steps of:
substantially disabling said deviation calculation means in said light control means;
continuously changing the first data applied to the first D/A converter means until a read level of the light sensing means reaches said a predetermined level and determining a first reference value for said first predetermined level;
energizing the energizing means;
continuously changing second data applied to the second D/A converter means until a read level of the light sensing means reaches a second predetermined level and determining a second reference value for said second predetermined level;
de-energizing said energizing means and applying said second reference value to the third D/A converter means;
restoring said light control means and energizing said energizaing means;
continuously decreasing the third data until a read level of the light sensing means reaches said first predetermined level and determining a third reference value for said third reference level;
so that said first, said second and said third predetermined levels are provided in accordance with a characteristic of the light emitting element.

* * * * *

UNITED STATES PATENT AND TRADEMARK OFFICE
CERTIFICATE OF CORRECTION

PATENT NO. : 4,785,443

DATED : November 15, 1988

INVENTOR(S) : Minami et al.

It is certified that error appears in the above-identified patent and that said Letters Patent is hereby corrected as shown below:

Col. 3, line 29, "supeimposedly" should be --superimposedly--.

line 32, "supe-" should be --super- --;

line 33, "rimposedly" should be --imposedly--.

Col. 4, line 30, delete "of".

Col. 7, line 32, "rentvvoltage" should be --rent/voltage--.

Col 10, line 62, "rad" should be --read--.

Col. 16, line 33 (claim 11), "light circuit" should be --light control circuit--.

Signed and Sealed this

Sixteenth Day of May, 1989

Attest:

DONALD J. QUIGG

Attesting Officer     Commissioner of Patents and Trademarks